United States Patent
Horner

[11] Patent Number: 5,617,757
[45] Date of Patent: Apr. 8, 1997

[54] LIQUID LEVEL MONITORING SYSTEMS FOR UNDERGROUND STORAGE TANKS AND METHOD FOR ITS INSTALLATION

[75] Inventor: Jack R. Horner, Bay City, Mich.

[73] Assignee: Horner Creative Products, Inc., Bay City, Mich.

[21] Appl. No.: 378,779

[22] Filed: Jan. 26, 1995

Related U.S. Application Data

[63] Continuation-in-part of Ser. No. 241,350, May 11, 1994.

[51] Int. Cl.$^6$ ............................ G01F 23/28; B23P 19/04; B25B 1/04
[52] U.S. Cl. .................. 73/290 V; 73/290 R; 29/227; 29/270; 29/278; 29/451; 269/153; 269/237
[58] Field of Search .................... 73/290 R, 290 V, 73/313; 29/227, 270, 278, 451; 33/379; 269/153, 237

[56] References Cited

U.S. PATENT DOCUMENTS

| | | | |
|---|---|---|---|
| 3,407,509 | 10/1968 | Martinez | 33/379 X |
| 3,922,008 | 11/1975 | Stiner et al. | |
| 3,958,313 | 5/1976 | Rossborough | |
| 4,094,537 | 6/1978 | Lyall | |
| 4,462,249 | 7/1984 | Adams | |
| 4,672,842 | 6/1987 | Hasselmann | |
| 4,748,846 | 6/1988 | Haynes | |
| 4,805,553 | 2/1989 | Haynes | |
| 4,852,054 | 7/1989 | Mastandrea | |
| 4,999,900 | 3/1991 | Anderson | |
| 5,140,753 | 8/1992 | Tuma | 33/365 |
| 5,216,914 | 6/1993 | Horner | |

FOREIGN PATENT DOCUMENTS

| | | | |
|---|---|---|---|
| 484215 | 5/1992 | European Pat. Off. | 29/270 |

OTHER PUBLICATIONS

"Red Jacket's Submersible Solvent Pump" Form No. 5174–3/81 Red Jacket Pumps, P.O. Box 3888, Davenport, Iowa 52808 Publication date unknown, but prior art.

Horner Creative Products, Inc. publication—publication date unknown, but prior art.

*Primary Examiner*—William A. Cuchlinski, Jr.
*Assistant Examiner*—Willie Morris Worth
*Attorney, Agent, or Firm*—Learman & McCulloch

[57] ABSTRACT

A liquid level monitoring system for underground storage tanks includes a submersible monitoring pipe system having telescoping sections that are biased to an extended position enabling the pipe to be self-retained within the tank between its upper and lower walls adjacent to and offset axially from a selected access opening in the tank, such as the discharge opening which normally accommodates the pump for the tank. The pipe system houses an electronic level sensor which is coupled to an above ground control system via conductor wires. An elongate accessing member having an openable and closable clamp jaw assembly for gripping the pipe system and disposing it in a compressed condition within the tank offset from the riser opening is provided as a part of the system.

15 Claims, 6 Drawing Sheets

LIQUID LEVEL MONITORING SYSTEMS FOR UNDERGROUND STORAGE TANKS AND METHOD FOR ITS INSTALLATION

This invention relates to liquid level monitoring systems for monitoring the level of liquid in underground storage tanks and also methods for the installation of such monitoring devices in such underground storage tanks. It is a continuation in part of application Ser. No. 241,350, filed May 11, 1994.

BACKGROUND OF THE INVENTION

Underground storage tanks of the above type are commonly employed for the storage of highly vaporous liquids, such as gasoline at gasoline service stations. The tanks are typically buried in the earth below the frost line. Such tanks typically have access openings through their top walls to which a riser tube is coupled which extends upwardly from the buried tank into an accessible manhole to permit filling of the tank. A similar access opening and riser tube is provided for admitting a submerged pump device extending vertically from the riser tube to the lower portion of the tank for pumping liquid from the tank to an above ground elevation. It is also common to provide the tank with additional access openings for a vent tube and a vapor recovery line. Each of the access openings, thus, has a dedicated singular usage necessitating that the opening remain unencumbered with devices such as a liquid level monitoring system.

Previously, it has been known to provide such underground storage tanks with liquid level monitoring devices, however, most such known devices are mounted in one of the aforementioned access openings in such manner as to inhibit or prevent the normal usage of such access opening for the purpose for which it is dedicated when the level sensing system is in place. U.S. Pat. No. 4,999,900 provides a liquid level monitoring system that can be mounted in the riser pipe of the fill tube while permitting normal usage of the fill tube, but limits the type and particularly the size of the monitoring system that may be used.

SUMMARY OF THE INVENTION

The liquid level monitoring apparatus of the present invention comprises a liquid level monitoring pipe housing a liquid level sensing device near its lower end for sensing the level of liquid contained in an underground tank. A mounting device is provided for supporting the pipe vertically within the storage tank between the upper and lower walls of the tank in a position adjacent to, but offset from, a selected access opening of the tank which is dedicated for normal usages other than an access opening for occupation by a liquid level sensor. The offset mounting of the pipe keeps the associated access opening substantially unencumbered to permit normal usage of the access opening when the monitoring apparatus is in place.

According to another aspect of the invention, a method of installing such a liquid level monitoring system in an underground storage tank is provided wherein the system includes a liquid level monitoring pipe, having telescopic portions that are extendible relative to one another to enable adjustment of the length of the pipe, and having a spring device acting therebetween to constantly urge the telescopic members to an expanded position. The method involves inserting the pipe into the tank through the selected access opening via an accessing device which compresses the spring to shorten the length of the pipe and allow the pipe to be fitted between the top and bottom walls of the tank in a vertical position offset from the associated access opening. The compressive force is thereafter released enabling the spring to bias the ends of the telescopic members into retaining engagement with the top and bottom walls of the tank to fixedly, yet releasably, support the pipe within the tank.

The apparatus and method of this invention provide a simple, commercially viable method and system for continuously monitoring the liquid level in underground storage tanks. The system is easy to use and permits the mounting of the liquid level monitoring device within the confines of the tank adjacent the access opening through which it was inserted so as to keep the access opening clear and unencumbered for its intended usage, and without requiring modification of the existing tank structure.

Other objects and advantages of the invention will become apparent with reference to the accompanying drawings and the accompanying descriptive matter.

DETAILED DESCRIPTION

Figure 1:
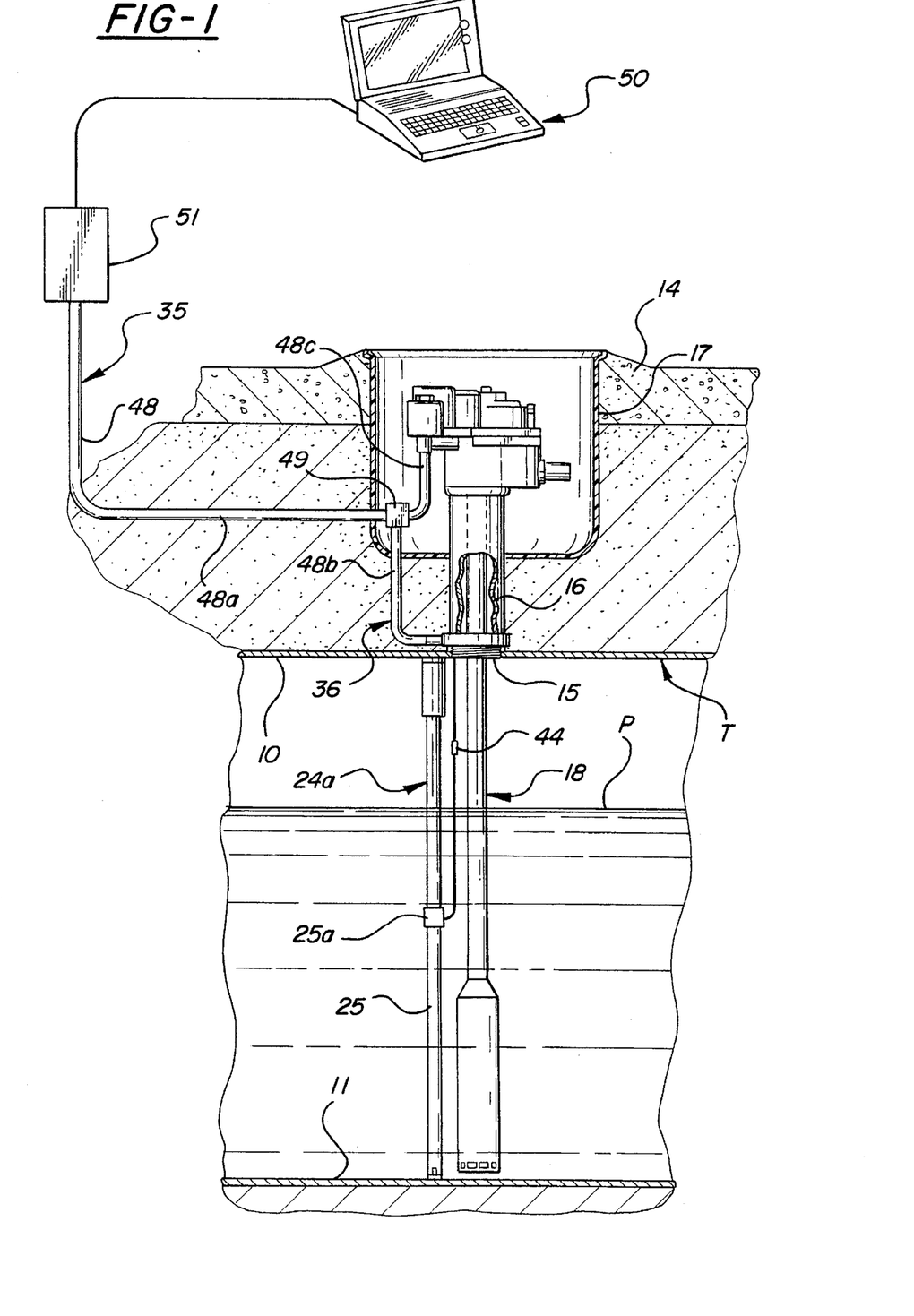
FIG. 1 is a schematic end elevational view illustrating a liquid level monitoring system constructed according to a first embodiment of the invention in place in an underground tank.
Figure 2:
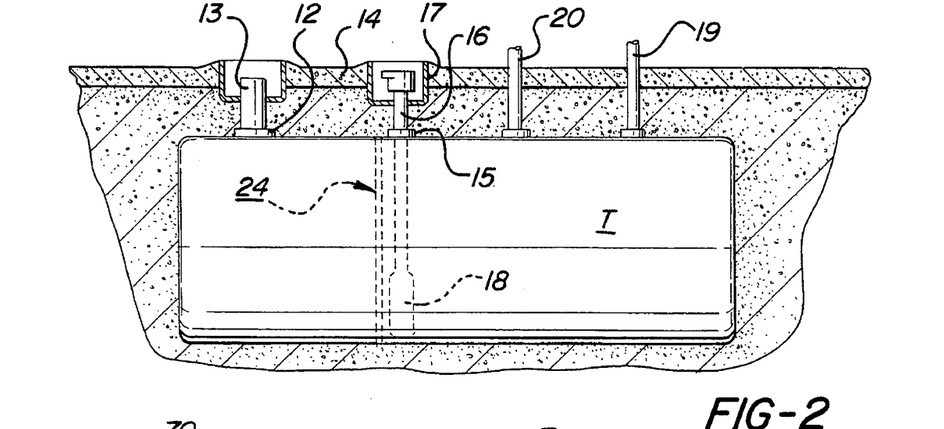
FIG. 2 is a schematic elevational view of the tank illustrating its various access openings.

A conventional underground storage system of the type commonly used for the storage of petroleum products, such as gasoline, includes an underground liquid storage tank T of conventional construction which is shown as being buried underground, as it would be in a typical gasoline service station. The cylindrical tank T has spaced top and bottom wall portions 10, 11 and is provided with various access openings through the top wall which are dedicated for a particular usage (FIG. 2). The tank T is filled with product through a releasably plugged tank fill tube 12 shown coupled to a riser tube 13 extending upwardly from the top of the tank T into a manhole recessed in the concrete apron 14 of the service station. Removal of the product from the tank is provided through a separate discharge opening 15 coupled to which is a similar riser tube 16 extending upwardly from the tank T to a similar manhole 17. The riser tube 16 mounts a submersible pump 18, shown best in FIG. 1, which extends through the opening 15 into the interior of the tank T and is submerged below the level of the product P contained within the tank. The tank T typically includes two additional openings 19 and 20 to which a vent pipe 21 and a vapor recovery line 22 are coupled, respectively, for venting the tank and recovering product vapors in a conventional manner.

The present invention provides a fluid level monitoring system or apparatus generally designated 23 for use with such underground storage tanks T for the purpose of continually monitoring the level of the product within the tank T. As will be described in greater detail, the level monitoring system is constructed and installed within the tank in such manner as to permit normal operation of the underground storage system, including the filling and dispensing of product from the tank, while the monitoring system is in place within the tank.

Figure 3:
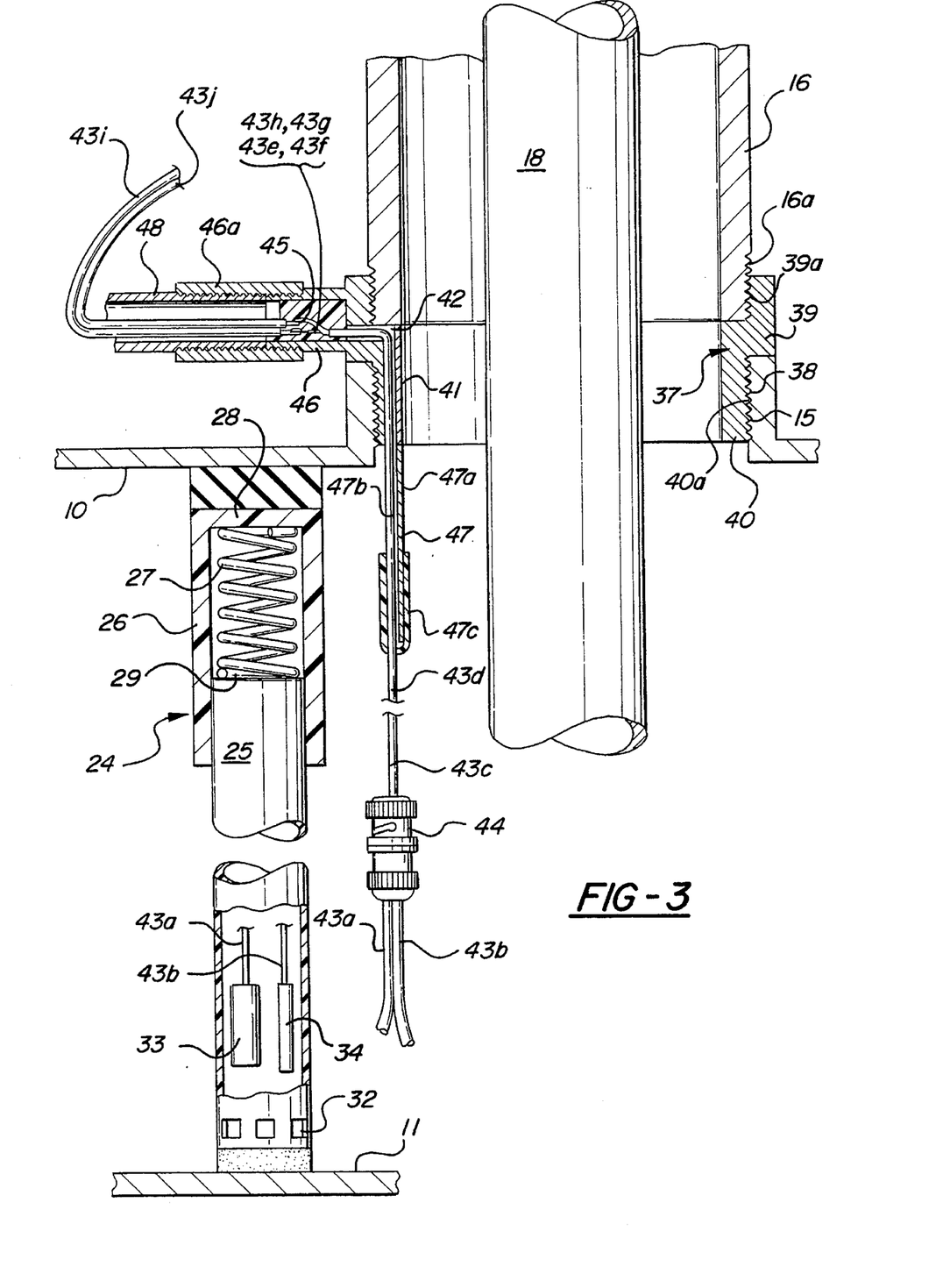
FIG. 3 is an enlarged partly sectional schematic view illustrating the liquid monitoring device of FIG. 1.

The apparatus 23 includes a liquid level monitoring pipe 24 adapted for vertical mounting within the tank T adjacent a selected one of the aforementioned access openings. FIGS. 1 and 3 illustrate a pipe constructed in accordance with a first embodiment of the invention which is shown mounted within the tank T adjacent the discharge opening 15 alongside the pump 18.

The pipe 24 has a telescoping construction provided by a lower tubular section 25 whose upper end is fitted slideably within the lower end of a relatively larger diameter upper tubular section 26. The pipe sections 25, 26 are fabricated from a material that resists attack from the liquid product, such as schedule 80 PVC plastic tubing.

Fitted within the upper pipe section 25 is a helical coil compression spring 27 whose upper end engages a spring seat 28 on the upper pipe section 25 and whose lower end engages a spring seat 29 provided by the closed upper end face of the lower pipe section 26. The spring 27 urges the pipe sections 25, 26 constantly apart toward an expanded condition, but permits the sections 25, 26 to be moved together against the compressive force of the spring so as to place the sections 25, 26 in a shortened, spring-loaded condition. This spring-loaded telescopic construction enables the pipe 24 to be self-mounted vertically within the tank T, as illustrated in FIGS. 1 and 3, wherein the spring 27 acts between the sections 25, 26 to urge their free ends into engagement with the upper and lower walls 10, 12 of the tank T with a force sufficient to retain the pipe in position within the tank.

Preferably, the free ends of the pipe sections 25, 26 are provided with end cushions or pads 30 and 31 that are fabricated from a material that is relatively pliable and resilient, such as the synthetic rubber, neoprene, to enhance the frictional gripping force between the pipe 24 and tank. The material selected for the pads should also be one that resists attack from the liquid product contained within the tank T and cannot cause sparks when the pipe sections are installed in position.

The lower end of the pipe 24 is provided with one or more slots or openings 32 for admitting the liquid product into the interior of the pipe 24. The pipe 24 serves to isolate the liquid therein from the environment within the tank, which typically may be somewhat turbulent when liquid is being added to or removed from the tank.

Housed within the pipe 24 adjacent the lower end is a liquid level sensor 33, and preferably also a liquid temperature sensor 34, provided respectively for sensing the level and temperature of the liquid in the tank T. The sensors 33, 34 preferably are electronic devices with the level sensor 33 being preferably an ultrasonic device and the temperature sensor being preferably a thermocouple device, both types of which are familiar to those skilled in the art and available, commercially, respectively, from Cosense, a company resident in Hauppauge, N.Y., U.S.A. and Omega, a company resident in Stamford, Conn., U.S.A.

Various sensor types are available and will also work well, such as those disclosed in U.S. Pat. Nos. 4,852,054 and 4,999,900. The sensors 33, 34 are coupled electronically to an above-ground electronic process control system, generally designated 35, via a connecting wire system generally designated 36. The connecting wire system 36 includes a ring-shaped tank adapter ring, generally designated 37, (FIG. 3) designed to be mounted on the tank T between the selected access opening and its associated riser tube or pipe. As illustrated best in FIG. 3, the discharge opening 15, has an internally threaded flange portion 38 that, for prior art systems, is threaded to mate with the externally threaded coupling portion 16a of the riser tube 16. The tank adapter 37 of the present invention has an upper end coupling portion 39 with internal threads 39a of the same thread configuration as that of the tank flange 38, and a lower end coupling portion 40 having external threads 40a of the same thread configuration as that of the riser tube coupling portion 16a. In this way, the adapter 37 can be coupled to both the access opening 16 and riser tube 17 without modification of either the upstanding flange 38 of the tank T or the coupling portion 16a of the riser tube 16.

The tank adapter ring 37 has a central opening 41 that is of the same inner diameter as that of the riser tube (typically four inches) and includes another separate passage 42 that extends longitudinally upwardly through the wall of the lower coupling portion 40 and then radially outwardly at a right angle through the wall of the upper coupling portion 39, such that the passage 42 communicates at its opposite ends with the interior and exterior of the tank T when the adapter 37 is mounted on the tank T.

The connecting wire system 36 also includes a pair of coaxial cables 43a, 43b that lead from the sensors 33, 34, up through the passage 42 of the adapter 37, and are coupled to the above-ground control system 35. The cables preferably extend from the sensors 33, 34 up through the pipe 24 to exit at a coupling 25a which couples the two pipe sections comprising pipe 25, and are releasably connected at their opposite ends to a pair of coaxial cable sections 43c and 43d by a separable electrical coupling 44. The coaxial cables 43c and 43d extend into the passage 42 and each is united at its opposite end to separate pairs of wires 43e, 43f and 43g, 43h at a junction 45 within the confines of an externally threaded pipe coupling 46 that projects radially outwardly from the adapter 37 at the exit of the passage 42. The wires 43e and 43f, and 43g, 43h are then protected by wire casings 43i and 43j respectively. The coupling 46 is filled with silicone rubber or other suitable material to seal the passage 42 fluid tight.

A guard or guide member 47 is welded or otherwise secured to the lower coupling portion 40 and extends downwardly therefrom into the interior of the tank to a dependant lower end. The guard member 47 is constructed preferably from a ductile metal strip of material, such as brass, that enables the guard to be bent without breaking. The guard 47 has a radially inner side surface 47a and an outer side surface 47b. The cable wires 43c, 43d are secured by insulative tape 47c to extend along the outer side surface 47b of the guard member 47 and thereby are shielded from contact with equipment, such as the pump 18, that under normal conditions may be inserted and withdrawn into the tank through the discharge opening 15.

The connecting wire system 36 also includes an underground conduit, generally designated 48 interconnecting the process control system 35, the pump 18, and the tank adapter 37. In the section of conduit 48a extending between the process control system 35 and the pump 18, there is provided a junction tee or part 49 mounted within the manhole 17 for the pump 18. Another section of conduit 48b extends between the junction tee 49 and the adapter 37. As shown in detail in FIG. 3, the conduit section 48b may be joined to the threaded adapter coupling 46 by an internally threaded sleeve 46a. The conductor wires 43e, 43f and 43g, 43h extend through the conduit section 48b and then into the conduit section 48a through the junction 49 to the process control system 35 along with additional wires (not shown) conventionally provided between the process control system and the pump and extending through the conduit section 48c.

The process control system 35 includes a computer 50 and an electronic interface 51 connected in the wire system 36. The present system is of the type where the thermocouple sensor 34 measures the temperature of the liquid in the tank and transmits this information to the computer which is programmed for the particular liquid which is in the tank. The computer 50, using this information, sends a signal to the interface 51 which adjusts the signal sent by the ultrasound sensor 34 which measures the speed of sound waves through the liquid in the tank and compensates for the density of the particular liquid in the tank which varies with the actual temperature of the liquid in the tank. The interface 51 then feeds a consequent modified electrical signal back to the computer which stores and records it on a continuous basis. Systems which perform in this manner are well known in the art and the present inventor makes no claim to having invented them. The computer 50 preferably is any suitable personal computer such as an IBM model 386SX. The interface computer system 51 is available from the previously mentioned Cosense Company or from the previously mentioned Omega Company. The recorded information may be displayed on the computer screen 52, stored on a disk, or may be transmitted to a printer (not shown) if desired. The computer 50 may be coupled electronically to the pump meter so as to be able to monitor and record the product output of the pump. The product removal transactions, as recorded from the sensors 33 and 34, and those provided by monitoring the output of the pump 18, may be compared as a double check.

THE OPERATION

The installation and operation of the system is as follows. The pipe 24 is selected according to the diameter of the tank T such that the end-to-end length of the upper and lower sections 25 and 26, when fully extended by the spring 27, are relatively longer than the dimension of the tank between its upper and lower wall portions 10 and 11. An access opening to the tank is selected for insertion of the pipe 24—the discharge or product removal opening 15 being illustrated in FIG. 1. The pipe 24 is first inserted through the opening 15 into the interior the tank T with the upper section 25 telescoped bodily toward the lower section 26 to compress the spring 27 and thereby shorten the end-to-end length of the pipe 24 sufficiently to allow it to be positioned vertically within the tank between the upper and lower wall portions 10 and 11 at a location adjacent to, but offset radially from, the opening 15, as illustrated best in FIGS. 1 and 3. The compression force may then be released, causing the spring 27 to force the upper and lower sections 25 and 26 into retaining biased engagement with the upper and lower wall portions 10 and 11 of the tank T to thereby self-support the pipe 24 within the tank T.

Once the pipe 24 is positioned within the tank T, the adapter 37 may be threaded into the tank flange 38 and the riser tube 16 threaded into the adapter 37. The conduit section 48b may then be installed between the adapter 37 and the junction 49 allowing the conductor wires to be threaded through the conduit 48 for connection with the process control system 35.

The guard member 47 may then be positioned to support the wires out of the path of the equipment being inserted through riser tube 16 and adapter access opening 41. This permits the access opening 15 to be utilized for its intended purpose which, in the example, is for the accommodation of the pump 18. Product removal transactions may then be monitored by the sensors 33 and 34 during normal usage of the storage tank system as described above, to monitor the level of product in the tank T.

Figures 4, 5:
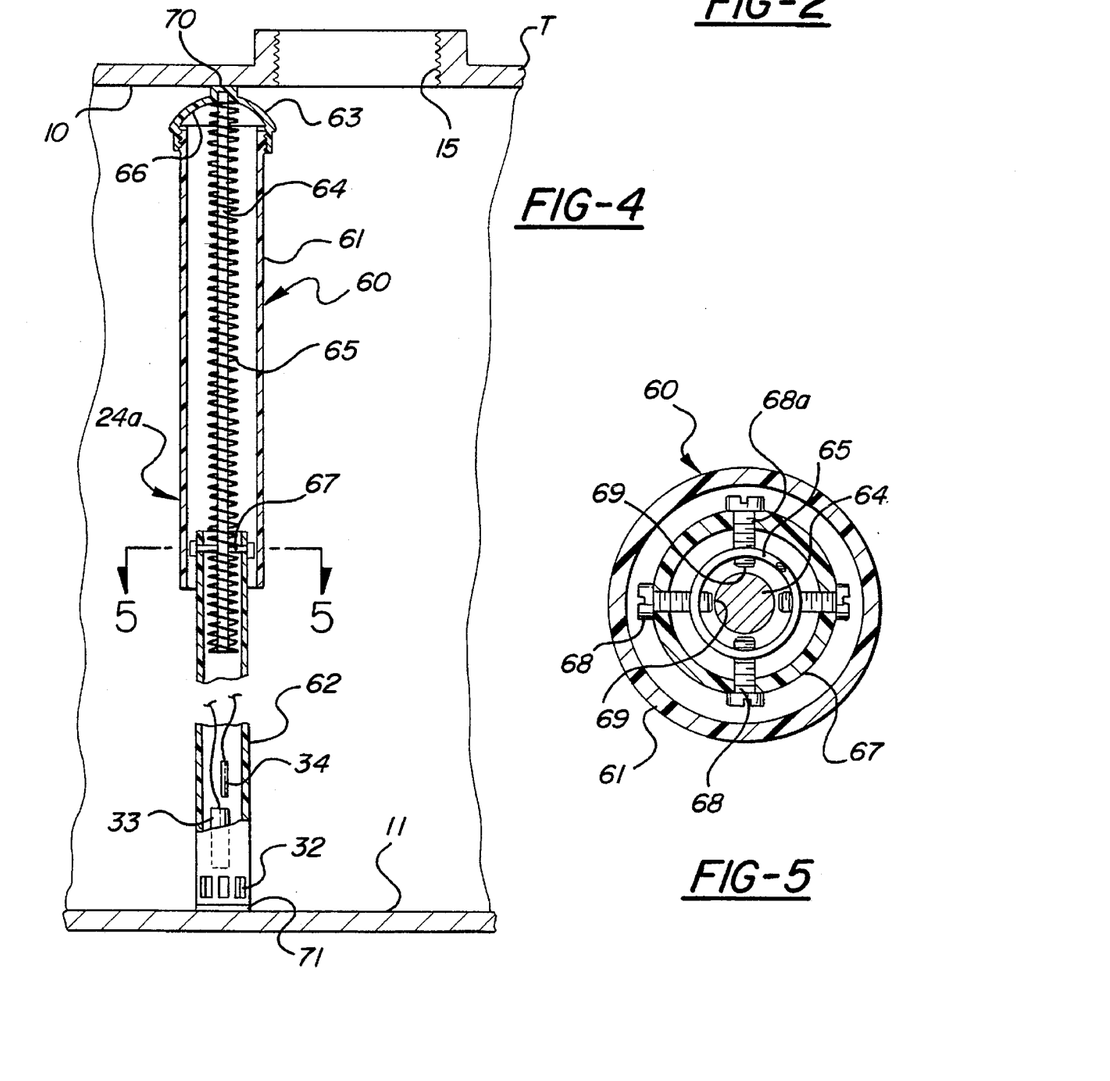
FIG. 4 is a schematic fragmentary elevational view illustrating an alternative embodiment of the liquid level monitoring system.
FIG. 5 is an enlarged sectional view taken on the line 5—5 of FIG. 4.

FIGS. 4 and 5 illustrate a second embodiment of a liquid level monitoring pipe system, generally designated 60. Like the first embodiment, the pipe 60 has upper and lower telescoping sections 61, 62 of tubular construction which may be fabricated of the same material. The upper tubular section 61 is slideable longitudinally over the lower tubular section 62 to thereby permit adjustment of the overall end-to-end length of the pipe 60. The upper section 61 is fitted at its upper end with a separable internally threaded cap 63, secured to which is a rod 64 extending coaxially with the upper section 61 downwardly into the lower tubular section 62 through the open upper end of the lower section 62. An elongate helical coil compression spring 65 encircles the rod 64 and confronts a spring seat surface 66 provided on the cap 63, and another spring seat, generally designated 67, provided on the lower tubular section 62. The spring seat 67 is designed to enable adjustment in the length of spring 65 provided between the spring seats 66 and 67 in order to adjust the extensibility of the tubular sections 61 and 62.

As shown best in FIG. 5, the spring seat 67 comprises a plurality of pins and preferably pan head machine screws 68 that are threaded through threaded apertures in the wall of the lower tubular section 62 adjacent its upper end in coplanar relation to one another, and which terminate at free ends 69 that are spaced radially from one another to provide sufficient radial clearance for the passage of the rod 64. However, the free ends 69 extend sufficiently far into the lower tubular section 62 so as to be accommodated within the space between adjacent coils of the spring 65, as illustrated in FIGS. 4 and 5. The extensibility of the pipe 60 may be adjusted externally of the tank by removing the cap 63 and rod 64, and then revolving the spring 65 in one direction or the other with respect to the screws 68, which act like mating screw threads with the helical coils of the spring, to increase or decrease the length of the spring above the screws 68. Once adjusted, the rod 64 may be extended back through the spring 65 and the cap 63 reattached to the upper pipe section 61.

The opposite ends of the pipe 60 may be provided with end cushions or pads 70 and 71, and inlet openings 32 near the bottom of the lower tubular section 62 as in the first embodiment of the invention. The same level and temperature sensors 33 and 34 and the associated wiring system, including the tank adapter 37, may be employed with the second embodiment in the same manner as that described for the first embodiment.

The installation of the pipe 60 is similar to that described for the first embodiment in that it is inserted through a selected access opening, such as the discharge opening 15, and mounted vertically within the tank T adjacent to, but offset axially from, the riser 16 to keep the opening free and unencumbered so that it may be used for its intended purpose, such as the accommodation of the pump 18. To install the pipe 60, its length is adjusted to be relatively longer than that of the spacing between the top and bottom walls 10 and 11 of the tank. For instance, to lengthen the pipe as illustrated in FIG. 4, the cap 63 is detached from the upper section 61 and the rod 64 withdrawn from the spring after which the spring 65 may be rotated clockwise to advance additional coils or winds of the spring above the pin seats 68. The rod and cap may then be reattached and the pipe 60 inserted into the tank T through the selected access opening, after which the upper section 61 may be bodily slid toward the lower tubular section 62 to thereby compress the spring 65 between the upper and lower seats 66 and 67 to enable positioning of the pipe 60 vertically within the tank between the upper and lower wall portions 10 and 11 offset from the opening 16. The compressive force of spring 65 may thereafter be released causing it to urge the upper and lower sections 61 and 62 into fixed engagement with the tank wall portions 10 and 11 to thereby self-support the pipe 60 within the tank T, as illustrated in FIG. 4. The tank adapter 37 may then be installed as described previously and the product level monitored in the same manner as that described for the first embodiment of the pipe.

In FIGS. 6–12 still a further embodiment of the invention is disclosed in which the level monitoring system includes an accessing member for placing the level monitoring pipe in offset position adjacent to a riser opening as in the first and second embodiments of the invention. The liquid level monitoring pipe, generally designated 72, has upper and lower telescoping sections, generally respectively designated 73 and 74, of tubular construction with the upper tubular section or assembly 73 slidable longitudinally over the lower tubular section 74 to permit a compression of the normal overall end-to-end length of the pipe section 72. The upper section 73 includes a tubular section 75 closed at its upper end by a cap 76 which preferably has an abrasive grit bonded to its upper surface for engaging the upper wall 10 of the tank.

Figure 6:
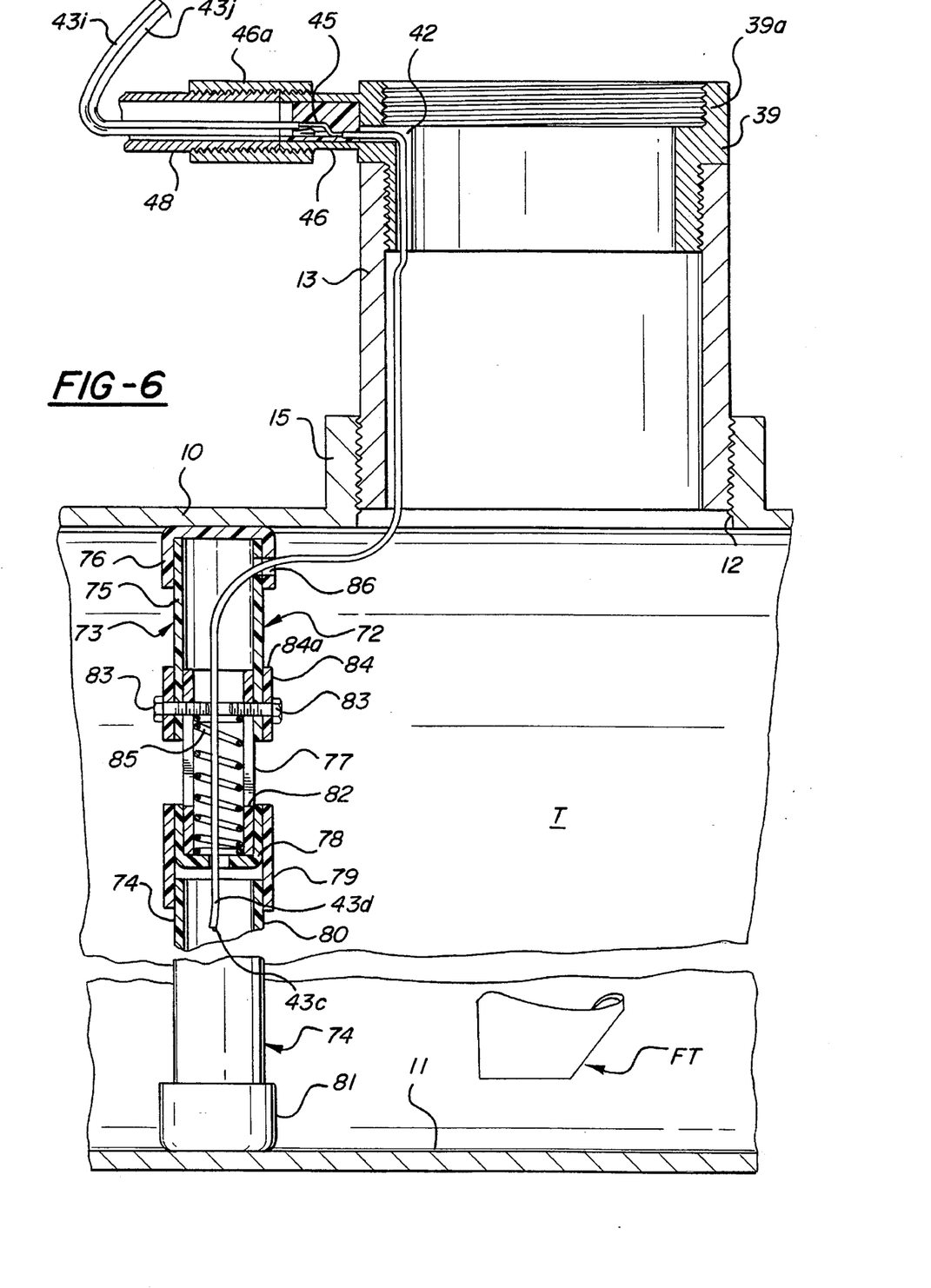
FIG. 6 is a schematic sectional side elevational view similar to FIG. 3 illustrating still another embodiment of the invention in which the construction is such as to facilitate placement of the monitoring system in an offset position by an accessing tool.

Telescopically received within the tube 75, is an upwardly projecting tube 77 which functions as the fixed upper end of the lower tubular system 74. At its lower end, tube 77 is closed by a cap 78 fixedly received within a collar 79 which is fixedly secured to lower tube 80. Lower tube 80 is closed at its lower end by a cap 81 which has a lower end surface provided with a grit bonded to it to frictionally interact with the lower wall 11 of the tank T.

Provided in the wall of tube 77 are radially opposite slits 82 to accommodate bolts or screws 83 which secure a sleeve or collar 84 on the lower end of tube 75 and extend inwardly far enough radially to compress a coil spring 85 provided in tube 77 when the upper sleeve 73 is compressed downwardly in a manner to be presently disclosed. The upper surface 84a of the collar 84 comprises a bearing surface which, when engaged and forced downwardly, causes the compression to occur. As in the other embodiments of the invention, sensors 33 and 34 (not shown in FIG. 6) connect with cables 43c and 43d which lead upwardly between the spring seat forming bolts 83 and out a passageway 86 provided in the tube 75 and cap 76 to the passageway 42 provided in the same fitting 39 (now in inverted position) which is illustrated in FIG. 3. The same numerals used in FIG. 3 have been used in FIG. 6 to identify the like elements in FIG. 6 and to refer to the connections to the sensor cables 43c and 43d. In this embodiment of the invention the level monitoring system is installed adjacent the tank fill tube opening 12 and a removable plumber's plug, such as shown in U.S. Pat. No. 5,216,914 which I incorporate herein by reference may be releasably secured in the upper end of riser 13 to cap it between filling operations via the threads 39a provided in fitting 39. Not shown in detail in FIG. 6 is the conventional drop fill tube FT which extends axially down riser tube 16 into the tank T adjacent monitoring tube system 72 to facilitate filling of the tank.

FIGS. 7–12 demonstrate the manner in which the monitoring system disclosed in FIG. 6 is inserted in vertically plumb, vertically offset position through a manhole 87 which, when not in use for filling the tank T with gasoline or other product, is maintained in capped condition by a suitable cap which is not disclosed. It is to be understood that the upper end of the manhole 87 can be threaded internally to receive a suitable cap.

Figures 7, 12:
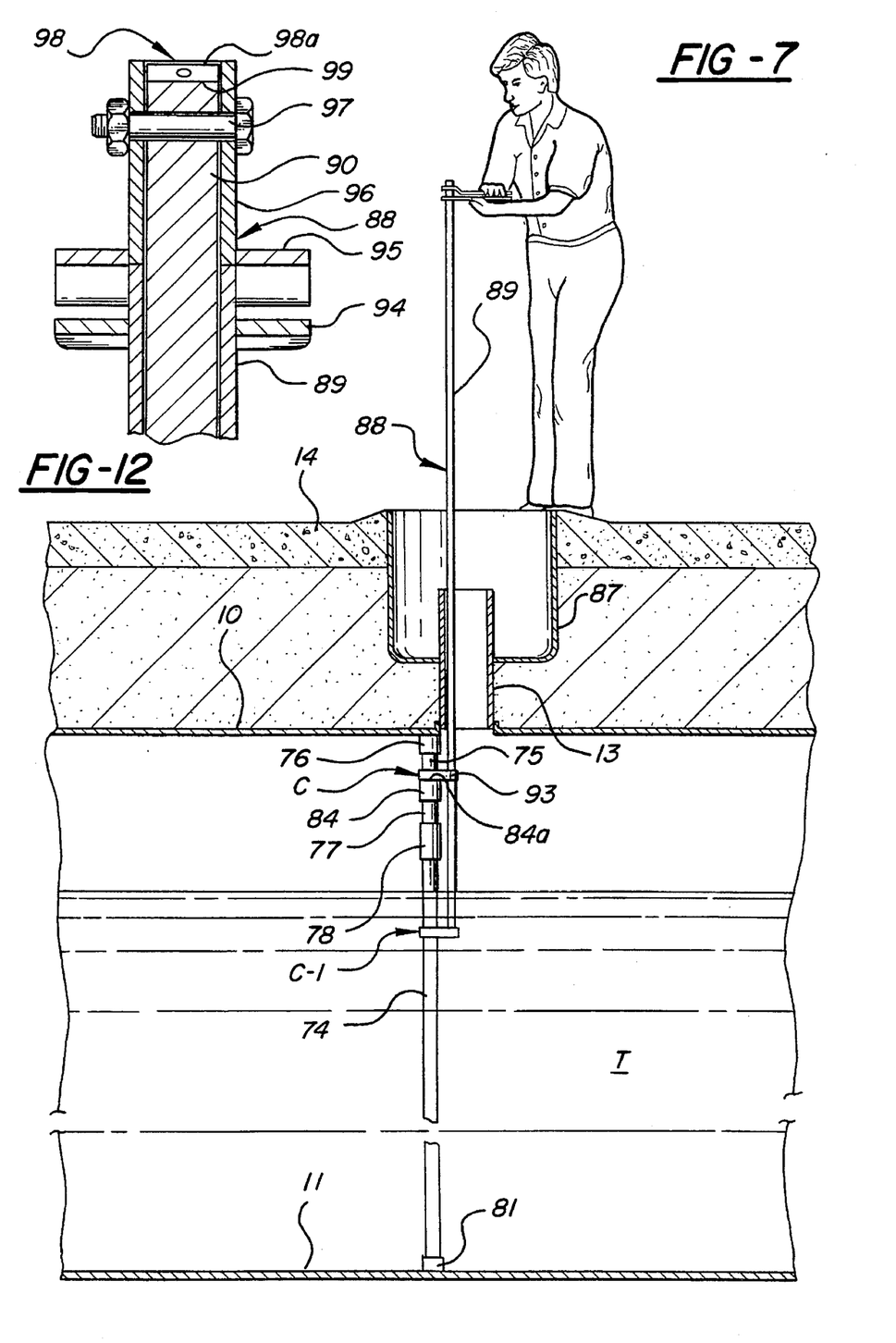
FIG. 7 is a schematic sectional side elevational view illustrating the manner in which the monitoring system may be placed in position, the cable or wiring system being omitted from the view in the interest of clarity.
FIG. 12 is a cross-sectional view on an enlarged scale taken on the line 12—12 of FIG. 8.

As illustrated in FIG. 7, an accessing clamp assembly or member, generally designated 88 is used to dispose the system more specifically illustrated in FIG. 6 between the tank walls 10 and 11 in a position laterally offset from the tank fill opening 12. The member 88 may comprise an outer tube 89 within which an inner shaft 90 is rotatable. Fixed to outer tube 89 by welding or in any other suitable manner are vertically spaced fixed clamp arms 91 which have curvilinear ends 91a at one end and curvilinear tube embracing portions 91b at their opposite ends. Laterally aligned with the ends 91b, are slotted openings 92 provided in the tube 89 to freely accommodate opposite clamp arms 93 having inner ends 93b which are welded or otherwise fixed to flatted surfaces 90a provided on the shaft 90. The opposite ends of clamp arms 93 are inwardly curved as at 93a to correspond to the curvilinearity of the ends of 91a of fixed clamp arms 91.

The vertically spaced pairs of clamp arms 91, 93 provide vertically spaced clamps C and C-1 which may be termed a clamp jaw assembly. At the upper end of the accessing member 88, a lever projection or arm 94, having a downturned outer end 94a, may be welded or otherwise secured to outer tube 89. Also provided is a companion upper lever arm 95 which is fixed to a sleeve 96, bolted as at 97 to the pivotal inner shaft 90. It will be observed that the lever 95 has a downwardly dependent keeper flange 95a which when engaged, prevents relative rotation of the shaft 90 in tube 88 to the spread position illustrated in FIG. 10. A typical clamping position of the arms 91 and 93 is disclosed in FIG. 9. It is to be understood that the arm 95 normally would dispose the keeper 95a vertically in the FIG. 8 position, but is sufficiently flexible that its outer end 95b may be lifted upwardly to raise keeper flange 95a above the level of arm 94 to release the arms 93 for rotation to the FIG. 10 position. At the upper end of collar 96, a common carpenter's level, generally designated 98, is received within tube 96 so that the inserter is able to monitor the vertical or plumb disposition of the member 88, and the level monitoring system 72 which it clamps, when the system 72 is being inserted. The level 98 comprises a transparent top, liquid-filled, closed compartment 99 with the usual bubble 98a.

LEVEL MONITORING SYSTEM INSERTION

Figures 8, 9, 10, 11:
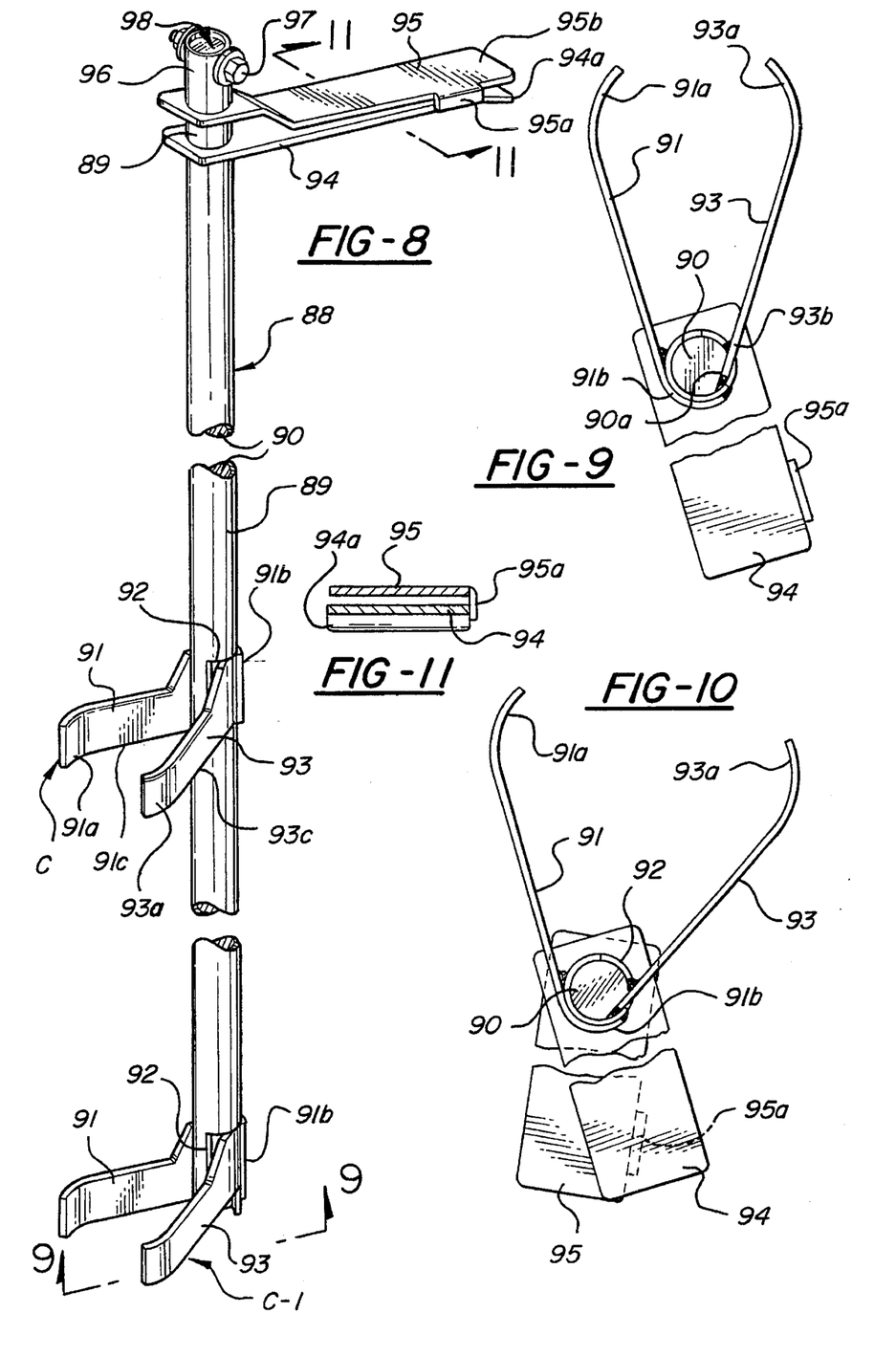
FIG. 8 is perspective elevational view of the accessing tool which is used with its clamps being shown in a closed clamping position.
FIG. 9 is an under plan view thereof on an enlarged scale, taken on the line 9—9 of FIG. 8.
FIG. 10 is a similar view illustrating the open position of the clamps.
FIG. 11 is an enlarged scale sectional view taken on the line 11—11 of FIG. 8.

As FIG. 7 indicates, the upper clamp assembly C clamps to the tubular portion 75 above the collar 84 and the lower clamp assembly C-1 clamps to the tubular portion 74. With the clamp assemblies C and C-1 disposed in the open position shown in FIG. 10, and loosely encircling the portions 75 and 74 of the monitoring system tube assembly 72, it is merely necessary to swing the pivotal lever arm 95 back toward the fixed lever arm 94 to a vertically aligned position in which the keeper 95a can drop down to the retaining position illustrated in FIG. 11, in order to operate the swingable arms 93 to grip the tubular parts 75 and 94 with clamp assemblies C and Cl, respectively. In the open position shown in FIG. 10, the levers 94 and 95 are in a vertically spread position in which the lever 95 has been lifted so that keeper 95 is freed from the lever 94. In this position of the parts, as shown in FIG. 10, the keeper portion 95a rides on the fixed lever 94 when lever arm 95 is moved counterclockwisely in FIG. 10 to swing moveable gripper arms 93 to the FIG. 9 clasping and carrying position. From a position in which keeper 95a is on top of lever 94, the keeper 95a moves to a position in which it functions as a stop, as shown in FIG. 9, to hold the lever arms 94 and 95 in the system clamping position.

With the level monitoring unit 72 in clasped position above ground and retained in this position by keeper 95a, the installer lowers the level monitor 72 down into the tank T to engage the bottom 11 thereof which may be a distance of perhaps fifteen feet from the level where the installer is standing on the concrete apron 14. With cap 81 engaging lower tank wall 11, the installer then exerts a depressing force on the accessing member 88 so that the lower bearing surfaces 93c and 91c on the respective clamp arms 93 and 91 of the upper clamp assembly C press downwardly on the upper edge or bearing surface 84a of the collar 84. This compresses spring 85 and adjusts the overall length of the level monitoring pipe system 72 so that it is of less length than the diameter of the tank T between the upper and lower walls 10 and 11 thereof, while the unit 88, and the system 72 that it clamps, are still in vertical alignment with the riser 13. During downward movement of the clamp assemblies C and C-1 with respect to the tube 74 of accessing member 88, the clamp C-1 can slide axially along the tubular member 74.

With the inserter then reading the level member 98 and noting that the bubble is centered so that the units 88 and 72 are vertically in plumb, it is merely necessary to pivot the accessing member 88 about cap 87 to a position in which the tubular level monitoring system 72 is vertically offset from the riser 13 to the position shown in FIG. 7. At this point, the downward pressure exerted on the assembly 88 is relieved and the spring 85 is permitted to expand the upper portion 72 vertically until the member 76 comes into tight engagement with the upper wall 10 and is retained there by the spring pressure exerted by spring 85. At this point, lever 95 is lifted to move it upwardly to disengage keeper 95a, and the lever 95 is swung to pivot shaft 98 and open the moveable arms 93 to the releasing position shown in FIG. 10. Thence the insertion unit 88 may be bodily moved in a generally radial path within riser 13 to a position in which it is released from and out of alignment with the inserted monitoring system 72, whence assessing member 88 can be withdrawn out the riser tube 13. The members 93 cannot be spread further than shown in FIG. 10 in that they engage the walls 92a of slots 92 so as to be prevented further from rotating relative to fixed arms 91.

The disclosed embodiments are representative of preferred forms of the invention, but are intended to be illustrative rather than definitive thereof. The invention is defined in the claims.

I claim:

1. For use in inserting a telescopic liquid monitoring system in a laterally offset position adjacent a dedicated riser leading upwardly from the top of an underground liquid storage tank, the monitoring system including upper and lower telescopic members with a bearing surface on one of said members, and a yieldable force exerter incorporated with said telescopic members for urging them to a spread position in which they are retained between the upper and lower walls of the tank:

a) an elongate accessing member having a laterally extending openable and closable clamp jaw assembly thereon for gripping said monitoring system and holding it in a position generally parallel to said accessing member;

b) control mechanism at an upper end of said accessing member for opening and closing said clamp jaw assembly; and c) a laterally extending bearing surface on said accessing member for engaging with the bearing surface on the monitoring system when a vertical force is exerted on said accessing member to relatively compress said upper and lower telescopic members sufficiently to enable the monitoring system to be moved to a position offset laterally from said riser in which it will clamp between the upper and lower wall portions of said underground tank when said force is released and said telescopic members are urged to said spread position.

2. The accessing member of claim 1 wherein said clamp jaw assembly comprises a fixed jaw and a pivotal jaw, and said bearing surface on the accessing member is a surface on said clamp jaw assembly.

3. The accessing member of claim 1 wherein a plumb-indicating level device assembly is supported on the upper end of said accessing member.

4. The accessing member of claim 2 wherein said bearing surface on the monitoring system is an upper surface of a collar fixed on said upper telescopic member.

5. The accessing member of claim 1 wherein said accessing member is fixed in length and comprises an outer sleeve relatively rotatably housing an inner shaft, one of said jaws being fixed to said outer sleeve and the other to said shaft, and said control mechanism includes a control handle fixed to one of said sleeve and shaft for relatively rotating said sleeve and shaft and opening said pivotal jaw to release said monitoring system from said clamp jaw assembly once it is in installed position.

6. The accessing member of claim 5 wherein said control handle comprises a first lever fixed to said shaft and said control mechanism includes a second lever fixed to said outer sleeve adjacent said first lever; one of said levers having a keeper for engaging with the other lever to retain said levers and jaws releasably in gripping position.

7. The accessing member of claim 6 wherein said levers have free outer ends and said keeper comprises a flange projecting from the free end of one of said levers toward the other lever; and said lever free ends are relatively flexibly mounted so that said flange can be moved from a position in which it blocks relative movement of said levers to a position in which it does not.

8. A method of inserting an elongate monitoring tube system to be connected to an above ground indicator in an underground liquid storage tank, having a riser tube leading from an access opening in its top to above ground, with an elongate accessing member having releasable clamps for gripping the monitoring tube system and holding it in generally laterally offset position generally parallel with said accessing member, the monitoring tube system including upper and lower telescopic parts and a force exerter for urging said upper and lower telescopic parts apart to anchor between the top and bottom walls of said tank, comprising the steps of:

a) disposing said monitoring tube system in generally parallel disposition with said accessing member above ground and closing said clamps to grip said monitoring tube system;

b) inserting said accessing member and monitoring tube system down through said riser tube and forcing the upper and lower telescopic parts toward each other with downward force on said accessing means to dispose said monitoring tube system in a position laterally offset from said riser tube between the top and bottom walls of said tank while said accessing member remains vertically aligned with said riser tube;

c) Removing said downward force on said accessing means thereby activating said force exerter to urge said upper and lower telescopic parts into clamped relation with said top and bottom walls of said tank; and d) Releasing said clamps and withdrawing said accessing member from the monitoring tube system.

9. The method of claim 8 wherein said accessing member is operated to relatively compress said force exerter of the monitoring tube system once said monitoring tube system and accessing member are inserted into the tank, with the monitoring tube system engaging the bottom of the tank, to thereby facilitate manipulating the monitoring tube system into said laterally offset position.

10. The method of claim 9 wherein said upper and lower parts of said monitoring tube system are normally urged apart by said force exerter which comprises a spring under compression and said accessing tool is pressed downwardly against said upper part to compress said parts.

11. The method of claim 9 wherein said accessing member is withdrawn from said monitoring tube system and said riser tube, and control cables for said monitoring tube system are then connected with said indicator.

12. In combination with an elongate liquid monitoring system including upper and lower telescopic members, and a yieldable force exerter incorporated with said telescopic members and operable to urge them to a spread position in which they are self-retained between upper and lower walls of an underground liquid storage tank offset from a dedicated riser leading upwardly from a top of the underground liquid storage tank;

an elongated accessing member of a diameter which can be inserted into said riser and having a laterally projecting openable and closable clamp jaw assembly thereon for gripping the monitoring system; and control structure at an upper end of said accessing member for remotely opening said clamp jaw assembly to permit use of said member to place said monitoring system in laterally offset position when said claim jaw assembly is closed, and then permit said clamp jaw assembly to release said monitoring system so that said accessing member can be withdrawn.

13. The combination of claim 12 in which said accessing member includes relatively rotatable jaw-mounting members with a jaw on each comprising said jaw assembly and said control structure comprises a lever fixed to each of said jaw mounting members; one of said levers having a keeper thereon for engaging with the other lever to retain said levers and jaw-mounting members and jaws releasably in gripping position.

14. The combination of claim 13 wherein said keeper is a flange protruding from one of said levers toward the other lever.

15. The combination of claim 14 wherein said levers lie in vertically juxtaposed position when said jaws are in monitoring system gripping position.

* * * * *

UNITED STATES PATENT AND TRADEMARK OFFICE
CERTIFICATE OF CORRECTION

PATENT NO. : 5,617,757
DATED      : April 8, 1997
INVENTOR(S) : Jack R. Horner

It is certified that error appears in the above-indentified patent and that said Letters Patent is hereby corrected as shown below:

On the title page, item [54] and column 1, lines 1-3, the title should read as follows:

LIQUID LEVEL MONITORING SYSTEM FOR UNDERGROUND STORAGE TANKS AND METHOD FOR ITS INSTALLATION

Claim 12, line 15, after "said" (first occurrence) insert -- accessing --.

Signed and Sealed this

Fifth Day of August, 1997

Attest:

BRUCE LEHMAN

*Attesting Officer*  *Commissioner of Patents and Trademarks*